United States Patent [19]

Hunter

[11] Patent Number: 4,841,762
[45] Date of Patent: Jun. 27, 1989

[54] SYMMETRY CALIBRATION METHOD FOR MULTI-CONFIGURATION ROBOTS

[75] Inventor: Bradley L. Hunter, Sharon, Mass.

[73] Assignee: Automatix Incorporated, Billerica, Mass.

[21] Appl. No.: 224,192

[22] Filed: Jul. 21, 1988

Related U.S. Application Data

[63] Continuation of Ser. No. 115,654, Oct. 27, 1987, abandoned, Continuation of Ser. No. 16,999, Feb. 19, 1987, abandoned, Continuation of Ser. No. 786,652, Oct. 11; 1985, abandoned.

[51] Int. Cl.⁴ .............................................. G01L 25/00
[52] U.S. Cl. ........................................ 73/1 R; 901/15; 364/513; 364/571.01
[58] Field of Search ........................................ 901/2-6, 901/9, 14, 16-18, 50, 15; 364/513, 167, 571; 73/1 R, 1 D, 1 J

[56] References Cited

U.S. PATENT DOCUMENTS

| | | | |
|---|---|---|---|
| 4,233,491 | 11/1980 | Marvyama et al. | 901/16 |
| 4,362,977 | 12/1982 | Evans et al. | 901/16 |
| 4,372,721 | 2/1983 | Harjar et al. | 73/1 J |
| 4,481,592 | 11/1984 | Jacobs et al. | 364/513 |
| 4,581,566 | 4/1986 | Ekstrom et al. | 901/3 |
| 4,725,965 | 2/1988 | Keenan | 364/513 |
| 4,753,569 | 6/1988 | Pryor | 901/9 |
| 4,757,458 | 7/1988 | Takemoto et al. | 901/2 |

OTHER PUBLICATIONS

Whitney, "Industrial Robot Calibration Method and Results", 1984 International Computers in Engineering Conference and Exhibit, Aug. 12-15, 1984.

Primary Examiner—Stewart J. Levy
Assistant Examiner—Robert R. Raevis
Attorney, Agent, or Firm—Richard J. Birch

[57] ABSTRACT

A symmetry calibration method for calibrating multi-configuration robots is disclosed. Specific points in the robot envelope are selected and the robot is moved to each point twice using different configurations. A linear measurement is made from an arbitrary fixed surface to a selected point on the robot at each envelope point. The origin for an axis is determined when the measurements for both configurations at the envelope point are substantially equal.

5 Claims, 8 Drawing Sheets

AXIS 4 CALIBRATION

CONFIGURATION # 2
AXIS 1 = −100.2°
4 = −90
5 = −90
6 = 90

CONFIGURATION # 1
AXIS 1 = −79.8°
4 = 90
5 = −90
6 = −90

*FIG. 3A* $\theta_1 = -90°$, $\theta_3 = 0°$

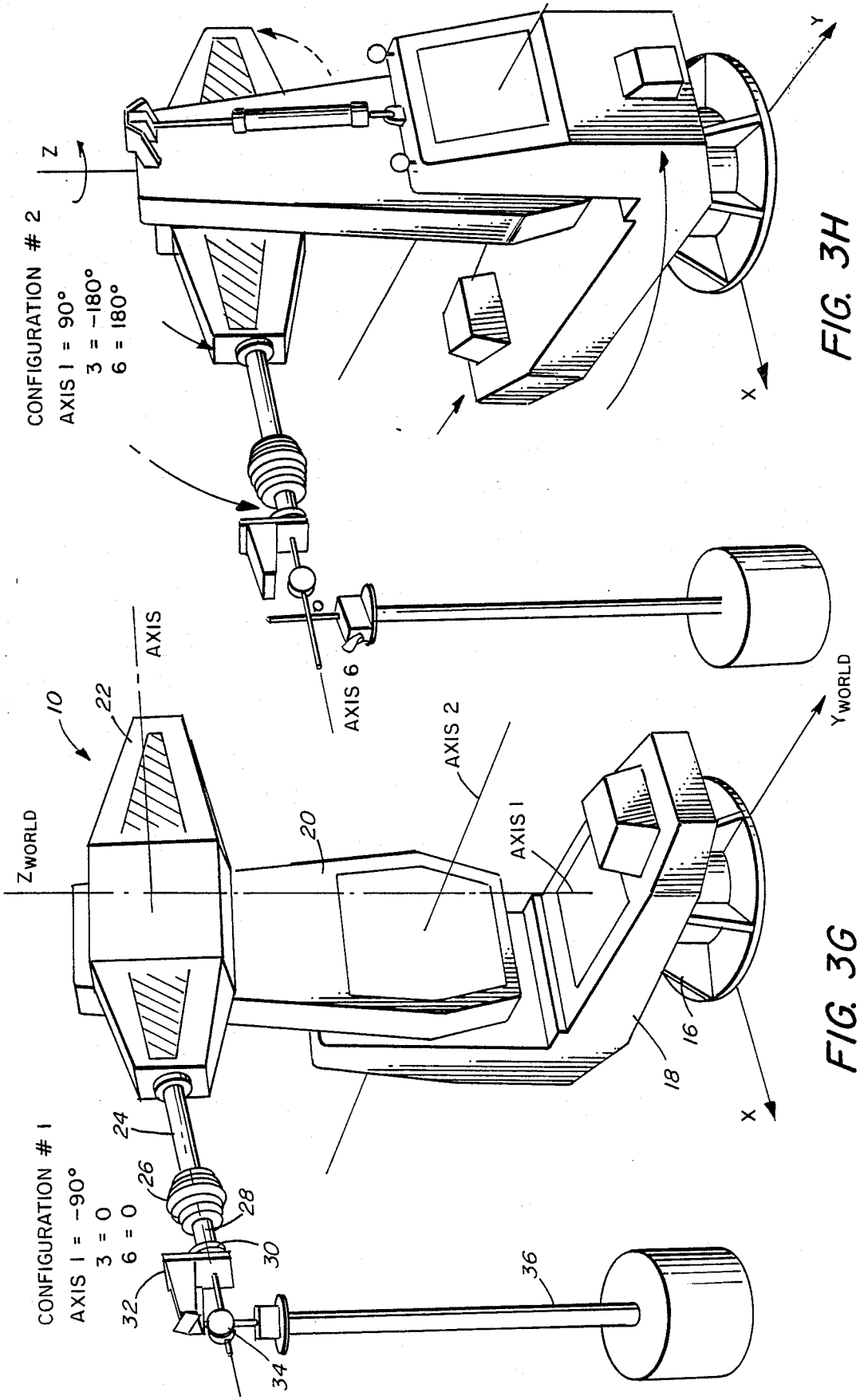

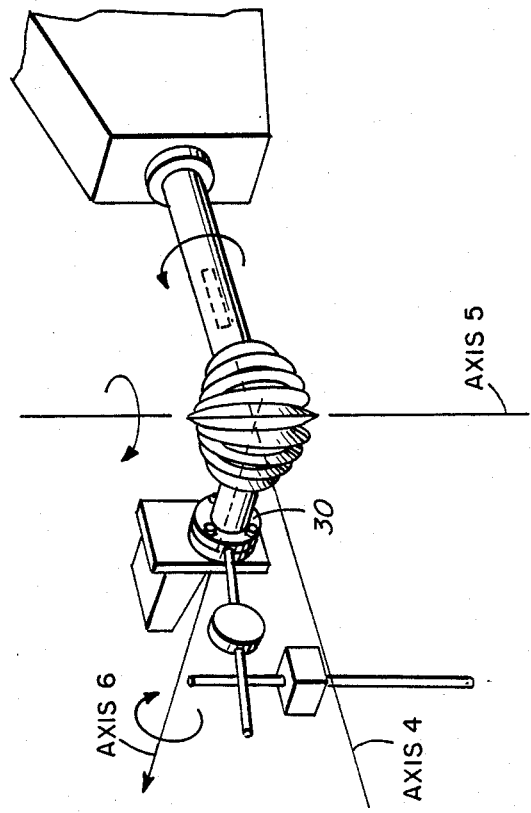
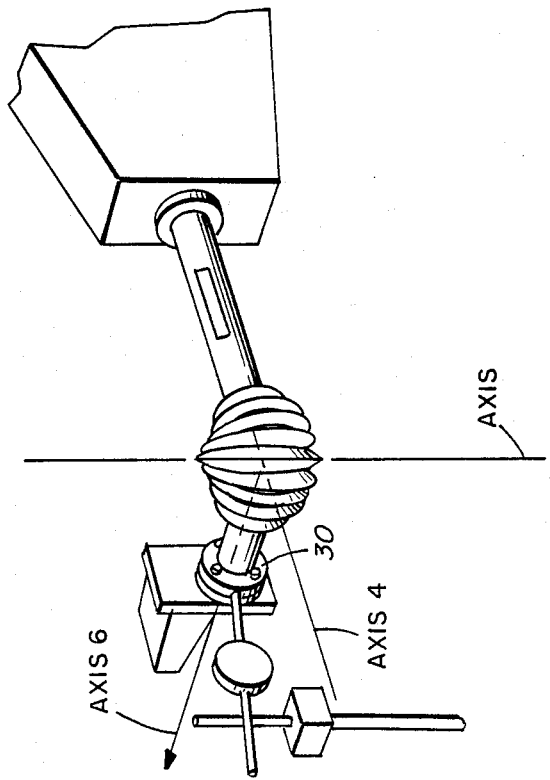
FIG. 5F
CONFIGURATION #2
AXIS 4 = 90°
5 = 90°
6 = 180°
AXIS 5 CALIBRATION
FIG. 5E
CONFIGURATION #1
AXIS 4 = 90°
5 = 90°
6 = 0

SYMMETRY CALIBRATION METHOD FOR MULTI-CONFIGURATION ROBOTS

CROSS-REFERENCE TO RELATED APPLICATIONS

The present application is a continuation of Ser. No. 115,654, filed Oct. 27, 1987, now abandoned, which was a continuation of Ser. No. 016,999 filed Feb. 19, 1987, now abandoned, which was a continuation of application Ser. No. 786,652 filed Oct. 11, 1985, now abandoned.

BACKGROUND OF THE INVENTION

The present invention relates to multi-configuration robots and, more particularly, to a method for calibrating the robot that utilizes the symmetrical geometry of two configurations of the robot.

The origin of a robot joint coordinate system must be accurately located in order for the arm solution to be accurate. Errors in the origin will cause distortions in the robot cartesian coordinate system. Other factors such as link length tolerances and skewed axes will produce distortions as well.

Many man hours are spent on most robot applications to teach the robot the specific program. If an encoder fails while the robot is in service, the origins will be lost. The new origin must be found so that the previously taught programs can be replayed without requiring reteaching.

Various methods have been proposed to allow calibration of the robot including calibration in the field after maintenance. For example, the robot can be calibrated initially at the factory with special brackets mounted on the robot after calibration to provide fixed reference points. When an encoder is replaced, a dial indicator can be screwed into the brackets and used to measure precisely when the robot joint is at the origin position. When all of the joints of the robot are in position, the new encoder is rotated to yield the same encoder count that was set at the factory.

Another method of calibrating a robot utilizes the gravity vector. A bubble level is placed on cast surfaces of the robot to establish an origin with respect to gravity. The theoretical origin of the joint coordinate system is, in general, unrelated to the direction of gravity. The robot must be mounted on a level surface and the cast surfaces must be parallel to the theoretical link for the gravity origin to agree with the theoretical origin. These conditions are essentially impossible to control in field service factory environments.

BRIEF SUMMARY OF THE INVENTION

It is accordingly a general object of the invention to provide a calibration system for a plural axis robot capable of multi-configurations.

It is a specific object of the invention to provide a symmetrical calibration method for a multi-configuration robot.

It is a further object of the invention to provide a calibration method in which specific points in the robot envelope are selected and the robot is moved to each point twice using different configurations. A linear measurement is made from an arbitrary fixed surface to a selected point on the robot, e.g., the robot wrist, at each point in the envelope. The origin for an axis is determined when the measurements for both configurations at the envelope point are substantially equal.

It is a feature of the invention that the method can be performed both in the factory and in the field utilizing the inherent capabilities of the robot itself.

It is another feature of the invention that the calibration method can be performed without requiring special jigs and special fixtures.

BRIEF DESCRIPTION OF THE DRAWINGS

These objects and features of the invention will best be understood from a detailed description of a preferred embodiment of the invention, selected for purposes of illustration and shown in the accompanying drawings in which:

FIGS. 3A through 3F are "stick figures" showing the calibration of the second axis of a plural axis robot;

FIGS. 3G and 3H are perspective views of the robot showing the calibration technique depicted in FIGS. 3A through 3F;

DETAILED DESCRIPTION OF THE INVENTION

Figure 1:
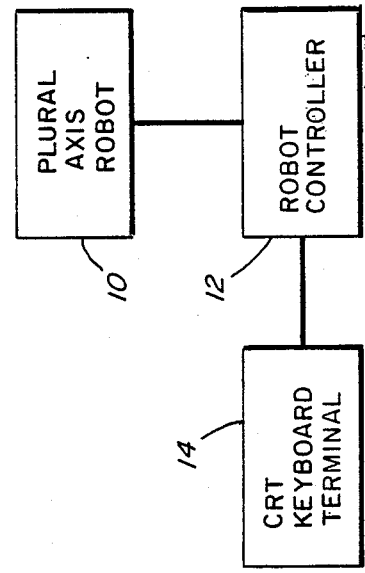
FIG. 1 is a block diagram of a plural axis robot, robot controller and input/output terminal.

Turning now to the drawings, FIGS. 1 illustrates in block diagram form a plural axis robot 10 that is controlled by a controller 12. Input and output information to and from robot controller 12 is handled by a CRT/keyboard terminal 14.

The calibration method of the present invention is based on the fact that the robot 10 can reach most points in its envelope in multi-configurations. Specific points in the envelope are selected and the robot is then moved to each point twice using different configurations. Thereafter, a linear measurement is made from an arbitrary fixed surface to a selected point on the robot, such as the robot wrist, at each point in the envelope. The origin for an axis is determined when the measurements for both configurations at an envelope point are substantially equal. The substantially equal measurements are obtained by iteratively adjusting the origin for each axis by one of the commonly used methods, e.g. adjusting a number in the software of the robot controller, altering switches on a circuit board used to control the robot or rotating the encoder in its mounting on the robot. Thus, by properly selecting the points and direction of measurements, a very sensitive measure of the origin of axes 2 through 5 can be achieved. The origin for Axis 1 is determined by centering the robot between its mechanical limits. The origin for Axis 6 is arbitrary in theory.

Figure 2A:
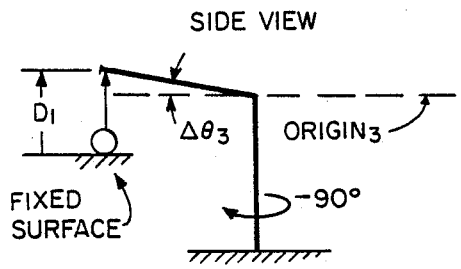
FIGS. 2A through 2F are "stick figures" showing the calibration of the third axis of a plural axis robot.
Figure 2B:
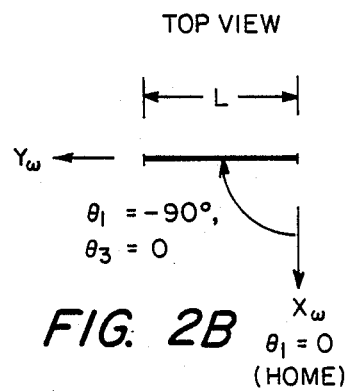
Figure 2C:
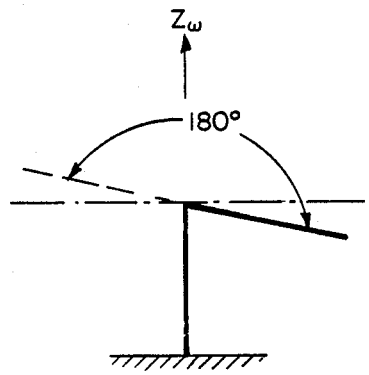
Figure 2D:
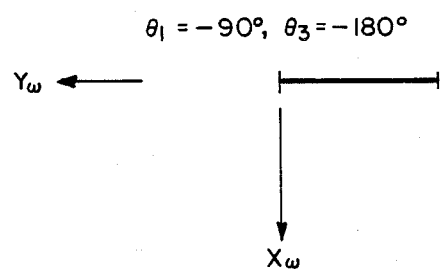
Figure 2E:
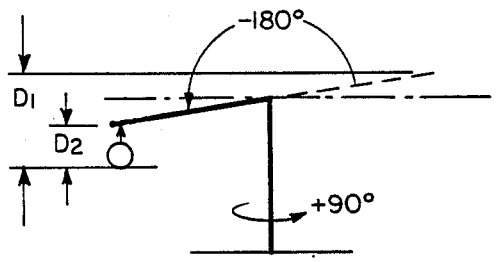
Figure 2F:
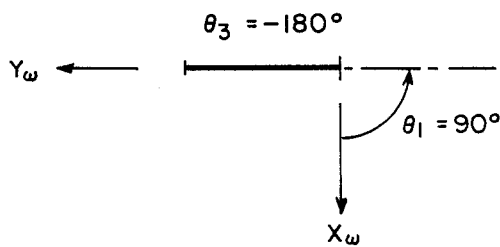
Figure 2H:
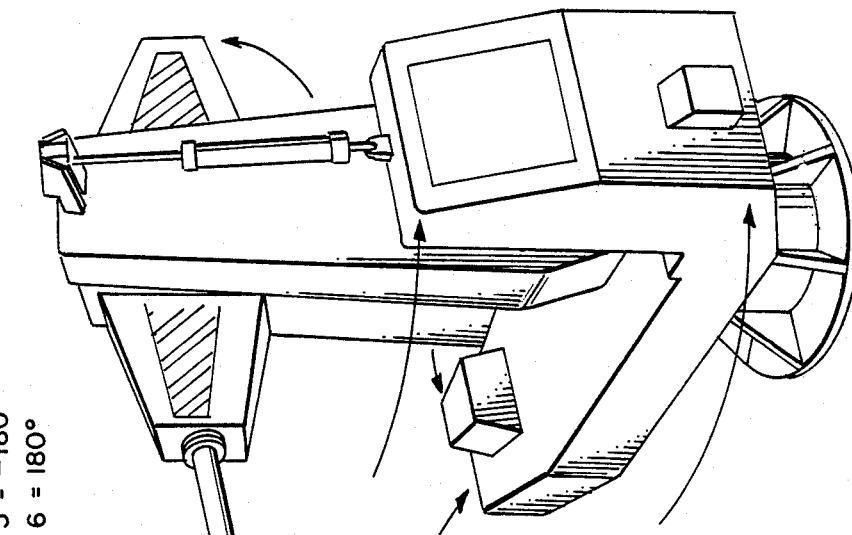
FIGS. 2G and 2H are perspective views of the calibration technique depicted in FIGS. 2A through 2F.
Figure 2G:
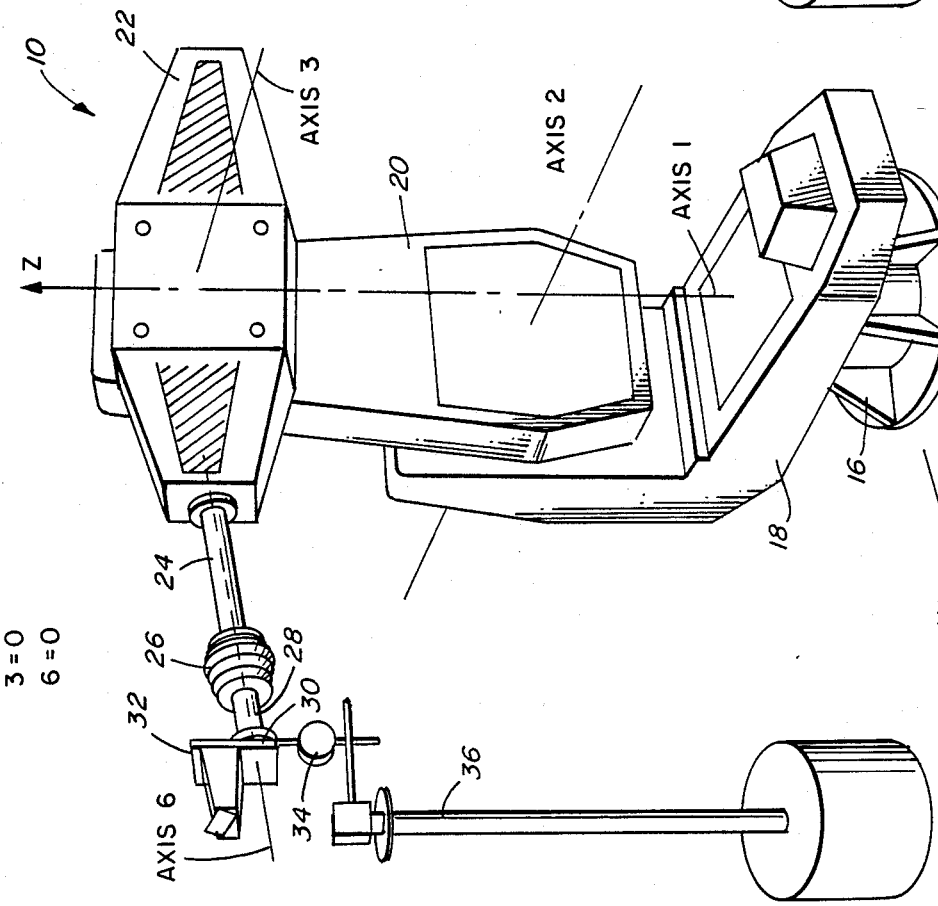

FIGS. 2 through 5 illustrate the calibration technique of the present invention. Although the calibration sequence is performed in the order of Axes 2, 3, 4 and then 5, for purposes of explanation and understanding, the following description of the calibration technique will commence with a discussion of Axis 3:

Referring now to the perspective views of FIGS. 2G and 2H, the plural axis robot 10 has a base 16 upon which is rotatably mounted a first link 18. Link 18 is rotatable about Axis 1. A second link 20 is rotatably mounted on the first link 18 for rotation about Axis 2. Similarly, a third link 22 is rotatably mounted on link 20 for rotation about Axis 3. Link 22 has rotatably mounted thereon an extension 24 that is connected to a robot wrist 26. Extension 24 is not characterized as a "link" because it is capable only of rotation about Axis 4 (see FIGS. 4H ad 4I) without providing translational movement. The next "link", as viewed in FIGS. 2G and 2H, is the fifth link identified by the reference numeral 28. The fifth link is rotatably mounted with respect to extension 24 through robot wrist 26 and is rotatable about Axis 5 (see FIGS. 5E and 5F). A flange 30 which constitutes the sixth link is rotatably mounted on the fifth link 28. Flange 30 is rotatable about Axis 6 as viewed in FIG. 2G. The rotatable flange 30 provides a mounting surface for bracket 32 which supports an appropriate tool such a, a welding torch.

The previously mentioned linear distance measurements are made by a dial indicator 34 mounted on a conventional stand 36. The relationship of the dial indicator 34 to the flange 30 during measurement operations is shown in the perspective drawings of FIGS. 2 through 5.

Having described the rotatable elements and their corresponding axes of the plural axis robot 10, the calibration operations for each of the axis will now be described. As mentioned previously, for purposes of ease of understanding the calibration operation with respect to one axis, Axis 3 has been selected as the appropriate example.

Referring to the "stick figures" of FIGS. 2A through 2F and the corresponding perspective views of FIGS. 2G and 2H, the robot is initially positioned at a point similar to the home or origin position except that Axis 1 is rotated −90 degrees as shown in the drawings. The distance from the edge of flange 30 to an arbitrary fixed surface is measured. The distance is identified as (D1) in the "stick figures". Axis 3 is then "flipped" −180 degrees as shown in FIGS. 2C and 2D in "stick form" and in the perspective views of FIGS. 2G and 2H. Finally, Axis 1 is rotated 180 degrees as shown in FIGS. 2E and 2F and the corresponding perspective views of FIGS. 2G and 2H. In theory, the flange 30 should return to the same point as shown in FIGS. 2A and 2B and the corresponding perspective view FIG. 2G.

Since the origin of Axis 3 may be in error, the actual distance (D2) from the flange 30 to the reference surface is different from the original distance (D1). This distance is used to calculate the error between the theoretical origin of Axis 3 and the actual origin $\Delta\theta_3 = 0.5 * (D1-D2)/L$ (small angles) where "L" is the distance from Axis 3 to the point at which the measurement was made. In the limit, when $\Delta\theta_3$ approaches zero, the small angle assumption becomes exact.

The choice of −90 degrees and 90 degrees as the two positions for Axis 1 is arbitrary. The only constraint is that the two positions be separated by 180 degrees.

Figure 3B:
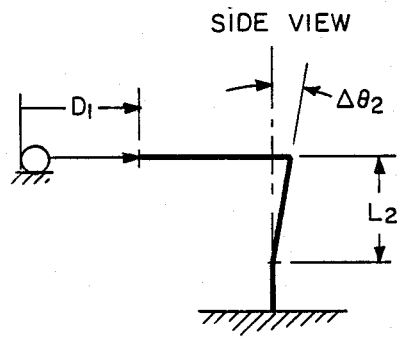
Figure 3B:
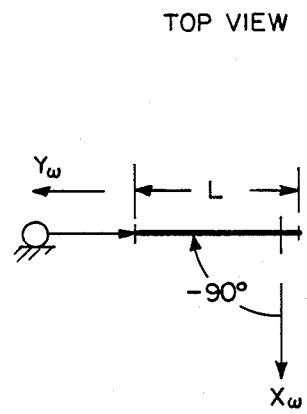
Figure 3C:
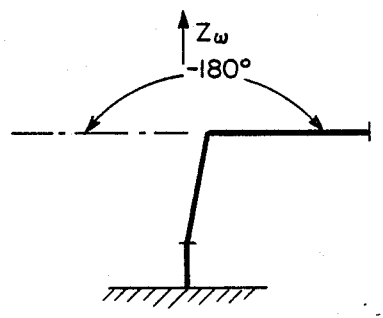
Figure 3D:
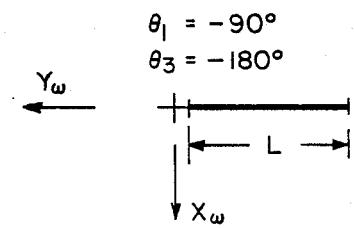
Figure 3E:
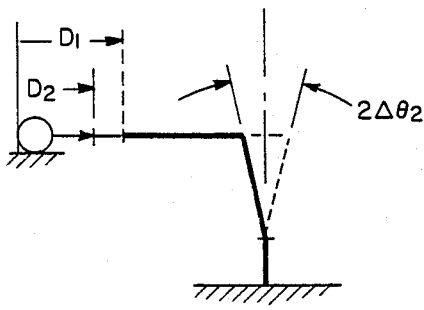
Figure 3F:
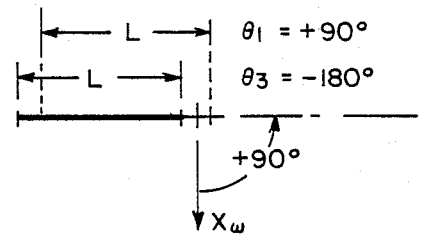
Figure 4A:
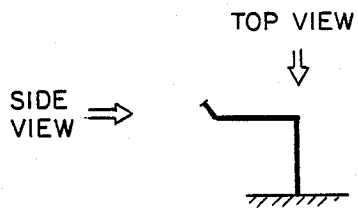
FIGS. 4A through 4G are "stick figures" illustrating the calibration of the fourth axis of a plural axis robot.
Figure 4B:
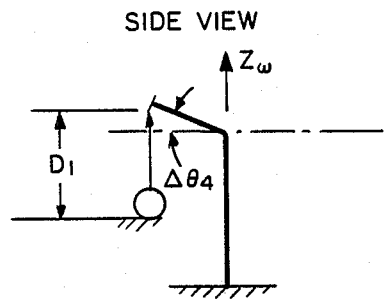
Figure 4C:
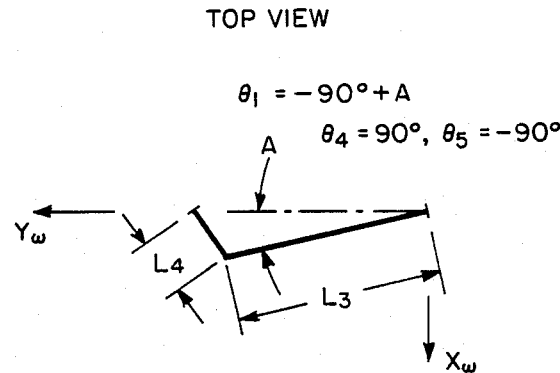
Figure 4D:
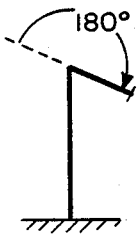
Figure 4E:
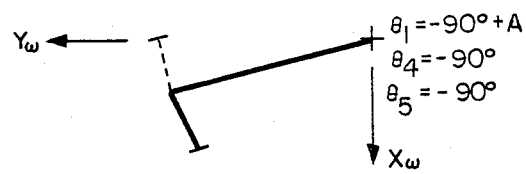
Figure 4F:
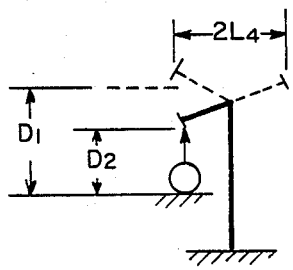
Figure 4G:
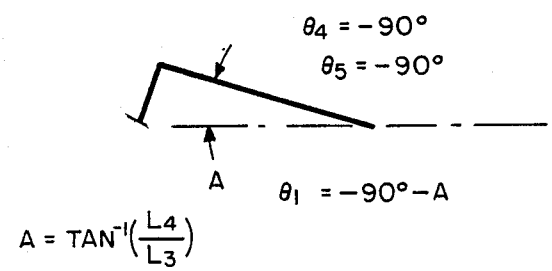
Figure 5A:
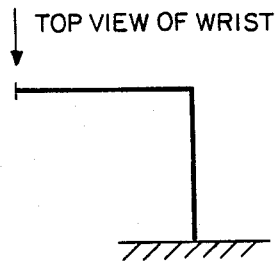
FIGS. 5A through 5D are "stick figures" illustrating the calibration of the fifth axis of a plural axis robot; and, FIGS. 5E and 5F are perspective views showing the calibration technique illustrated in the "stick figures" of FIGS. 5A through 5D.
Figure 5B:
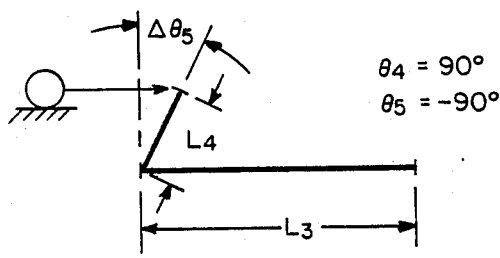
Figure 5C:
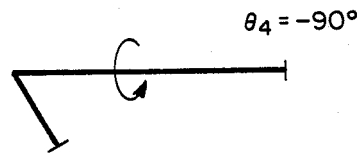
Figure 5D:
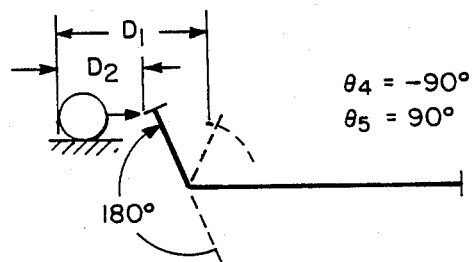

Referring now to the "stick figures" of FIGS. 3A through 3F and the corresponding perspective views of FIGS. 3G and 3H, the same positions used for Axis 3 calibration suffice for Axis 2. However, the measurement is made along the Y-axis of the world as shown in the Figures. The error in origin of Axis 2 is:

$$\Delta\theta_2 = 0.5 * (D1-D2)/L_2; \Delta\theta_2$$

where $L_2$ is the length of the second link, i.e., the distance between Axes 2 and 3.

Figure 4I:
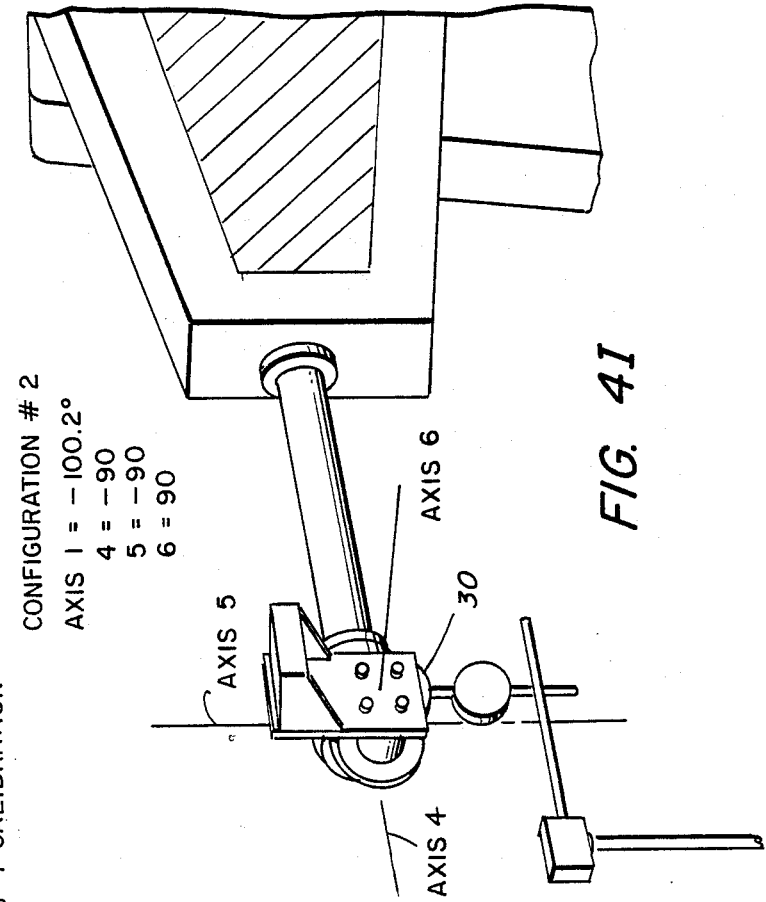
FIGS. 4H and 4I are perspective views of the robot showing the calibration technique depicted in FIGS. 4A through 4G.
Figure 4H:
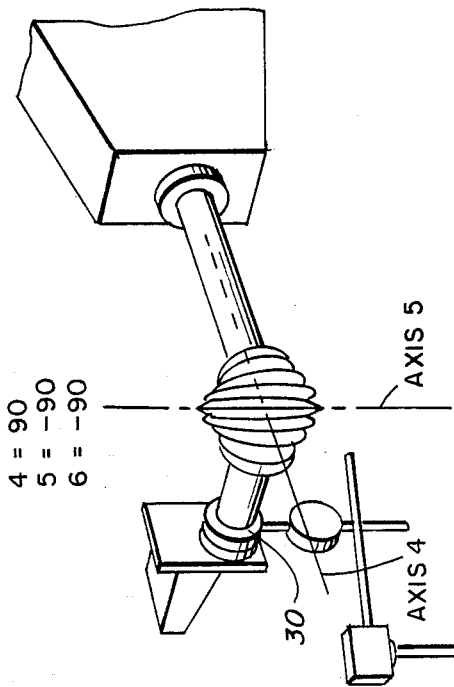
Figure 4J:
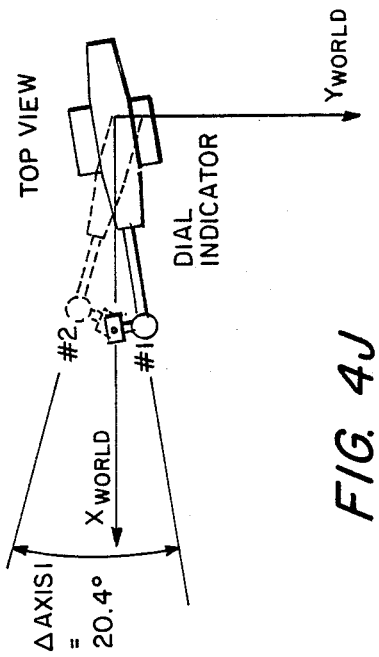
FIG. 4J is a top view illustrating the calibration technique shown in FIGS. 4A through 4G.

The origin of Axis 4 is determined with respect to the plane of rotation of Axis 1 as shown in the "stick figures" of FIGS. 4A through 4G and the corresponding perspective views of FIGS. 4H and 4I and the top view of FIGS. 4J. In the origin of Axis 4 is correct, Axis 5 moves on a plane parallel to the plane of rotation of Axis 1 when Axis 4 is 90 degrees or −90 degrees. The error in origin for Axis 4 is:

$$\Delta\theta_4 = 0.5 * (D_1-D_2)/L_4; \Delta\theta_4$$

where $L_4$ is the distance from Axis 4 to the point on the flange 30 where the measurement is made. In the calibration sequence for Axis 4, the first link 18 is rotated through an angle of 2 A. The angle A=ARCTAN(L4/l3) where L3 equals the distance from the third axis to the intersection of the fourth and fifth axes and L4 equals the distance from the intersection from fourth and fifth axes to the measurement point on flange 30.

The origin of Axis 5 is determined with respect to Axis 4. Thus, if Axis 5 is at 90 degrees or −90 degrees, then the fifth link 28 lies in the plane normal to Axis 4 as shown in FIGS. 5A through 5F.

The origin for Axis 1 is determined in a different manner. For Axis 1, the mounting surface can be treated as a "link" because the choice of an origin is arbitrary. While an origin may not exist in the theory, this is little comfort to the field service technician who must replace an encoder in the field. For Axis 1, therefore, the origin is selected as the angle that lies halfway between the positive and negative mechanical limits of travel. The operator rotates the first link 18 through robot controller 12 by means of keyed input to terminal 14. When the robot link 18 contacts the positive limit, the operator records the angle of Axis 1. The operation is then repeated for the negative limit and the two angle readings are averaged. The average is used as the Axis 1 origin.

Although the preceding description has been directed to a robot with six axes, it will be appreciated that the symmetrical calibration method of the present invention is applicable to robots with fewer axes that are capable of multiple configurations. Having described in detail a preferred embodiment of my invention, it will now be apparent to those skilled in the art that numerous modifications can be made therein without departing from the scope of the invention as defined in the following claims.

What I claim and dsire to protect by Letters Patent of the United States is:

1. A method for calibrating a plural axis robot having a plurality of links rotatable about a corresponding plurality of axes to permit the robot to move within an envelope and with each axis of said plurality of axes having an origin, said method comprising the steps of:
(1) selecting a point in the envelope of the robot;
(2) moving the robot to said envelope point in a first configuration of the links of the robot;
(3) making a linear distance measurement from an arbitrary surface to a point on one of the robot links;
(4) moving the robot to said envelope point in a second configuration of the links of the robot;
(5) remeasuring the linear distance from the arbitrary surface to the point on said one robot link; and,
(6) adjusting the origin of the axis of one of said axes if the two linear distance measurements are not substantially equal.

2. The method of claim 1 wherein steps 1 through 5 are repeated and further comprising the step of adjusting the origin of another one of said axes if the two measurements are not substantially equal.

3. The method of claim 2 further comprising repeating the steps of claim 2 until the desired number of axes of the robot have been calibrated.

4. A method for calibrating a plural axis robot having a first link rotatable in a plane about a first axis having an origin, a second link rotatably mounted on said first link for rotation about a second axis having an origin, a third link rotatably mounted on said second link for rotation about a third axis having an origin, an extension rotatably mounted on said third link with said extension defining a fourth axis having an origin, a fifth link rotatably mounted on said extension for rotation about a fifth axis that intersects the fourth axis defined by said extension with said fifth axis having an origin, a sixth link rotatably mounted on said fifth link for rotation about a sixth axis with said sixth axis having an origin that intersects both of said fourth and fifth axes at their intersection and a controller for controlling the operation of each of said links and for setting the origin of each axis, said method comprising the steps of:

A.
(1) measuring a linear distance from a first arbitrary surface to a first point on a link;
(2) rotating the first link through 180 degrees;
(3) rotating the third link through −180 degrees from 0 degrees to −180 degrees;
(4) rotating the sixth link through 180 degrees;
(5) remeasuring the linear distance from said first arbitrary surface to said first point on said link;
(6) adjusting the origin of the second axis if the two linear distance measurements are not substantially equal;

B.
(1) measuring a linear distance from a second arbitrary surface to a second point on said link;
(2) rotating the first link through 180 degrees;
(3) rotating the third link through −180 degrees from 0 degrees to −180 degrees;
(4) rotating the sixth link through 180 degrees;
(5) remeasuring the linear distance from said second arbitrary surface to said second point on said link;
(6) adjusting the origin of the third axis if the two linear distance measurements are not substantially equal;

C.
(1) measuring a linear distance from a third arbitrary surface to a third point on said link;
(2) rotating the first link through 2 Å, where L3 equals the distance from the third axis to the intersection of said fourth and fifth axes, L4 equals the distance from the intersection of said fourth and fifth axes to said second point on the sixth link, and Å=ARCTAN (L4/L3)
(3) rotating the extension through 180 degrees from 90 degrees to −90 degrees;
(4) rotating the sixth link through 180 degrees;
(5) remeasuring the linear distance from said third arbitrary surface to said third point on said link;
(6) adjusting the origin of the fourth axis if the two linear distance measurements are not substantially equal, and, D.
(1) measuring a linear distance from a fourth arbitrary surface to a fourth point on said link;
(2) rotating the extension through 180 degrees;
(3) rotating the fifth link through 180 degrees from −90 degrees to 90 degrees;
(4) rotating the sixth link through 180 degrees;
(5) remeasuring the linear distance from said fourth arbitrary surface to said fourth point on said link;
(6) adjusting the origin of the fifth axis if the two linear distance measurements are not substantially equal.

5. A method for calibrating a plural axis robot having a first link rotatable in a plane about a first axis having an origin, a second link rotatably mounted on said first link for rotation about a second axis having an origin, a third link rotatably mounted on said second link for rotation about a third axis having an origin, an extension rotatably mounted on said third link with said extension defining a fourth axis having an origin, a fifth link rotatably mounted on said extension for rotation about a fifth axis that intersects the fourth axis defined by said extension with said fifth axis having an origin, a sixth link rotatably mounted on said fifth link for rotation about a sixth axis with said sixth axis having an origin that intersects both of said fourth and fifth axes at their intersection and a controller for controlling the operation of each of said links and for setting the origin of each axis, said method comprising the steps of:

A.
(1) measuring a linear distance from a first arbitrary surface to a first point on the sixth link;
(2) rotating the first link through 180 degrees;
(3) rotating the third link through −180 degrees from 0 degrees to −180 degrees;
(4) rotating the sixth link through 180 degrees;
(5) remeasuring the linear distance from said first arbitrary surface to said first point on the sixth link;
(6) adjusting the origin of the second axis if the two linear distance measurements are not substantially equal;

B.
(1) measuring a linear distance from a second arbitrary surface to a second point on the sixth link;
(2) rotating the first link through 180 degrees;
(3) rotating the third link through −180 degrees from 0 degrees to −180 degrees;
(4) rotating the sixth link through 180 degrees;
(5) remeasuring the linear distance from said second arbitrary surface to said second point on the sixth link;

(6) adjusting the origin of the third axis if the two linear distance measurements are not substantially equal;

C.
- (1) measuring a linear distance from a third arbitrary surface to a third point on the sixth link;
- (2) rotating the first link through 2 Å, where L3 equals the distance from the third axis to the intersection of said fourth and fifth axes, L4 equals the distance from the intersection of said fourth and fifth axes to said second point on the sixth link and Å=ARCTAN (L4/L3)
- (3) rotating the extension through 180 degrees from 90 degrees to −90 degrees;
- (4) rotating the sixth link through 180 degrees;
- (5) remeasuring the linear distance from said third arbitrary surface to said third point on the sixth link;
- (6) adjusting the origin of the fourth axis if the two linear distance measurements are not substantially equal; and, D.
- (1) measuring a linear distance from a fourth arbitrary surface to a fourth point on the sixth link;
- (2) rotating the extension through 180 degrees;
- (3) rotating the fifth link through 180 degrees from −90 degrees to 90 degrees;
- (4) rotating the sixth link through 80 degrees;
- (5) remeasuring the linear distance from said fourth arbitrary surface to said fourth point on the sixth link;
- (6) adjusting the origin of the fifth axis if the two linear distance measuremnts are not substantially equal.

* * * * *